United States Patent
Shimizu et al.

(10) Patent No.: US 8,465,886 B2
(45) Date of Patent: Jun. 18, 2013

(54) COLOR FILTER SUBSTRATE FOR LIQUID CRYSTAL DISPLAY DEVICES AND LIQUID CRYSTAL DISPLAY DEVICES

(75) Inventors: Mie Shimizu, Tokyo (JP); Takeshi Ikeda, Tokyo (JP); Hidesato Hagiwara, Tokyo (JP); Koichi Minato, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 320 days.

(21) Appl. No.: 12/926,034

(22) Filed: Oct. 21, 2010

(65) Prior Publication Data
US 2011/0096273 A1    Apr. 28, 2011

(30) Foreign Application Priority Data
Oct. 23, 2009   (JP) ................. 2009-244502

(51) Int. Cl.
*G02B 5/20* (2006.01)
*G02F 1/1335* (2006.01)

(52) U.S. Cl.
USPC ............................................. 430/7; 349/106

(58) Field of Classification Search
None
See application file for complete search history.

(56) References Cited

U.S. PATENT DOCUMENTS 6,455,208 B1   9/2002   Yamashiki et al.
2008/0143935 A1*   6/2008   Akao et al. ............ 349/106

FOREIGN PATENT DOCUMENTS

| CN | 101374914 | 2/2009 |
|---|---|---|
| JP | 5-196930 | 8/1993 |
| JP | 2000-136253 | 5/2000 |
| JP | 2000-187114 | 7/2000 |
| JP | 2001-214077 | 8/2001 |
| JP | 2008-20905 | 1/2008 |
| JP | 2008-40486 | 2/2008 |
| JP | 2008-145868 | 6/2008 |
| JP | 2009-103992 | 5/2009 |
| JP | 2009-181070 | 8/2009 |
| WO | 2008/044519 A1 | 4/2008 |

OTHER PUBLICATIONS

Japanese Office Action issued Sep. 13, 2011 in corresponding Japanese Patent Application 2009-244502.
Chinese Office Action issued Aug. 31, 2012 in corresponding Chinese Patent Application No. 201010582879.7.

* cited by examiner

*Primary Examiner* — John A. McPherson

(57) ABSTRACT

Disclosed is a color filter substrate which exhibits color filter contrast of not less than 9000 and includes a transparent substrate, and a plurality of color pixels differing in color and formed on the transparent substrate, wherein each of the plurality of color pixels is formed of a photosensitive color composition containing two or more kinds of pigments, a birefringence Δn of a pigment dispersion represented by following equation (1) and a content of pigments contained in the photosensitive composition satisfies prescribed conditions, and, an absolute value of retardation in thickness direction (Rth) of the color pixels which is represented by following equation (2) is confined to a range of 0-3 nm.

$$\Delta n = n_{XY} - n_Z \quad (1)$$

$$Rth = \{(Nx+Ny)/2 - Nz\} \times d \quad (2)$$

9 Claims, 1 Drawing Sheet

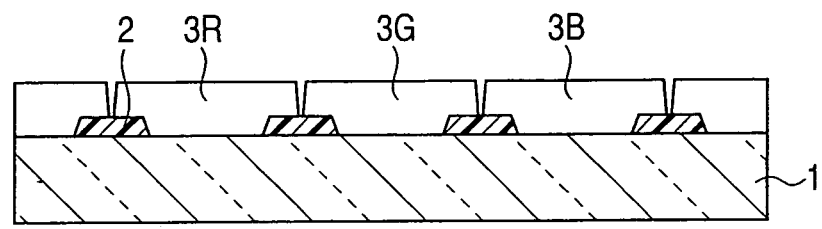
F I G. 1
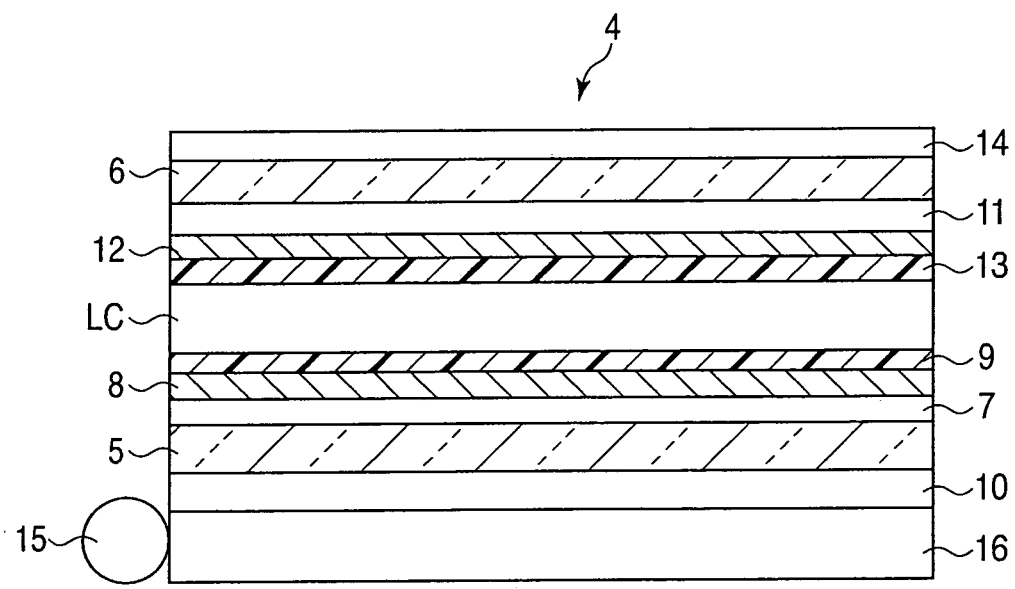
F I G. 2

COLOR FILTER SUBSTRATE FOR LIQUID CRYSTAL DISPLAY DEVICES AND LIQUID CRYSTAL DISPLAY DEVICES

CROSS-REFERENCE TO RELATED APPLICATIONS

This application is based upon and claims the benefit of priority from prior Japanese Patent Application No. 2009-244502, filed Oct. 23, 2009, the entire contents of which are incorporated herein by reference.

BACKGROUND OF THE INVENTION

1. Field of the Invention

This invention relates to a color filter substrate for a liquid crystal display device, and to a liquid crystal display device which is provided with this color filter substrate. In particular, this invention relates to a color filter substrate for a liquid crystal display device which is excellent not only in contrast but also in oblique visibility and to a liquid crystal display device having such features.

2. Description of the Related Art

In recent years, flat-panel display devices such as a liquid crystal display device are increasingly demanded to enhance the picture image and power-saving thereof and to lower the manufacturing cost thereof. In the case of the color filter, it is demanded to exhibit sufficient color purity, sufficient brightness and high contrast.

Especially, in the case of a large television or a high-image-quality monitor, where the display contrast is not less than 2000, there is now a demand to exhibit not only a high front face contrast but also a very high level of display quality with respect to viewing angle characteristics including oblique viewing direction. In order to improve the contrast and visibility to attain such a high level, it is required to improve not only so-called front contrast, i.e. a difference between the white display and the black display when the liquid crystal display device is viewed from the front face thereof but also the oblique visibility so as to minimize the changes in colors and coloring of the black display when the liquid crystal display device is viewed from an oblique direction.

Depending on the kinds of color filter application, such as a television, a monitor and a mobile display device, the colors (red, green, blue, etc.) of the color filter are frequently required to be delicately adjusted. In spite of such a delicate adjustment of colors, it is still demanded to realize a wider viewing angle and a black display of higher quality.

With respect to the method of improving the oblique visibility, a technique is disclosed, wherein the difference is provided in retardations of the color layers such as red, green and blue pixels of a color filter to thereby improve the oblique visibility (see for example, JP-A 5-196930). There has been also tried to reduce the retardation that the color filter may exhibit, wherein a polymer having a planar structural group on its side chain is introduced into a color layer, or a birefringence-reducing particles having a birefringence which is opposite in sign to that of the polymer is introduced into the color layer (see for example, JP-A 2000-136253 and JP-A 2000-187114).

Further, there has been proposed an idea to incorporate a retardation-adjusting agent in the color layers of color filter, thus enabling each of color pixels to have a different retardation, thereby making it possible to improve the viewing angle compensation (oblique visibility) of black state of a liquid crystal display device without necessitating the provision of a polymeric liquid crystal layer in addition to the color layers or without necessitating the change of thickness in each of sub-pixels (see for example, JP-A 2008-20905, JP-A 2008-40486 and JP-A 2008-145868).

The conventional techniques described above however are accompanied with a problem that when it is tried to control the retardation of display pixels, various characteristics including the physical properties of color filter are caused to change. The reason is that when a side chain having a planar structural group is introduced into a polymer taking the role of pigment carrier in a coloring macromolecular thin film, the density, mechanical strength and chemical resistance of the thin film may be caused to deteriorate or the exposure sensitivity and developing properties of the thin film may be caused to change when creating a pattern by means of photolithography, thereby raising various problems in the manufacture of the color filter.

For example, the retardation-adjusting agent disclosed in JP-A 2008-145868 has a light absorption in a wavelength region of 250-400 nm, it is necessary to apply an excessive exposure and, hence, the productivity of color filter would be badly affected. Further, the additional incorporation of the retardation-adjusting agent or the birefringence-reducing particles, both being incapable of contributing in anyway to the development of the strength of film, in the color layer would deteriorate the mechanical strength, chemical resistance, adhesion of the color layer. Meanwhile, in the case of a liquid crystal display device designed to exhibit high image qualities, the display device is now demanded to exhibit not only a black display of high purity and high concentration but also very high contrast.

The present inventors have already found out that, in order to realize not only a black display having a very high contrast and pure black but also high quality oblique visibility, it is required to decrease the value of retardation in thickness direction Rth to nearly zero in all of every color pixels of color filter. More specifically, it is required to regulate the value of retardation in thickness direction Rth of every color pixels to the range of 0-3 nm. However, since the conventional red pigments are formed to have a relatively large birefringence Δn, it has been difficult to decrease the value of Rth to nearly zero. Further, even in the green layer, since green pigments or yellow pigments to be contained therein inherently have a large value as an absolute value of birefringence, it has been difficult, as in the case of the red layer, to decrease the Rth to nearly zero.

Furthermore, it has been difficult to obtain a color filter which is not more than 3 nm in the absolute value of retardation in thickness direction and which is capable of securing the photolithographic suitability thereof and overcoming the problem of oblique visibility while retaining a color filter contrast of as high as not less than 5000, furthermore not less than 9000.

In the case of a transparent resin film having a different birefringence or a different retardation in thickness direction Rth, it is generally possible to utilize so-called "additivity rule", which make it possible to adjust the Rth through the lamination of the films. Even in the case of the color filter for a liquid display device, it is possible to confirm the usefulness of almost the same additivity rule as in the transparent resin film through the lamination of color layers each having a different retardation in thickness direction Rth. In the case of a pigment dispersion consisting of a dispersion of plural kinds of pigments differing in color however, no one has succeeded in confirming complete additivity rule as yet even though it is more likely possible to confirm the additivity rule as far as the mixing of pigments is concerned. Namely, the adjustment of the Rth has been performed empirically in most cases.

Further, even in the case where pigments are the same in color having the same pigment number, the retardation in thickness direction Rth may differ depending on the manufacturing method thereof and on the manufacturer thereof, raising confusion when manufacturing a photosensitive color composition.

BRIEF SUMMARY OF THE INVENTION

An object of the present invention is to provide a color filter substrate which makes it possible to obtain a high contrast, a wide viewing angle and tightened black even if delicate adjustment is made on the color thereof.

Another object of the present invention is to provide a liquid crystal display device which is incorporated with a color filter substrate having such features.

According to a first aspect of the present invention, there is provided a color filter substrate which exhibits color filter contrast of not less than 9000 and comprises: a transparent substrate; and a plurality of color pixels differing in color and formed on the transparent substrate, wherein each of the plurality of color pixels is formed of a photosensitive color composition containing two or more kinds of pigments, a birefringence Δn of a pigment dispersion represented by following equation (1) and a content of pigments contained in the photosensitive composition satisfies all of below-described conditions (a), (b) and (c), and, an absolute value of retardation in thickness direction (Rth) of the color pixels which is represented by following equation (2) is confined to a range of 0-3 nm.

(a) a content of a pigment exhibiting an absolute value of birefringence Δn less than 0.011 is confined to 34% by mass to 100% by mass based on a total amount of pigments in the photosensitive color composition;

(b) (a content of pigment exhibiting an absolute value of birefringence Δn less than 0.011)>(a content of pigment exhibiting an absolute value of birefringence Δn not less than 0.011 and less than 0.016)≧0; and (c) (a content of pigment exhibiting an absolute value of birefringence Δn not less than 0.011 and less than 0.016)≧(a content of pigment exhibiting an absolute value of birefringence Δn of 0.016-0.055)≧0:

$$\Delta n = n_{XY} - n_Z \quad (1)$$

wherein $n_{XY}$ is an average in-plane refractive index; and $n_Z$ is a refractive index in thickness direction; and $$Rth = \{(Nx+Ny)/2 - Nz\} \times d \quad (2)$$

wherein Nx is a refractive index in x-direction in plane of a color layer constituting the color pixel; Ny is a refractive index in y-direction in plane of a color layer constituting the color pixel; Nz is a refractive index in thickness direction of a color layer constituting the color pixel; Nx constitutes a lagging axis represented by Nx≧Ny; and d is a thickness (nm) of the color layer.

According to a second aspect of the present invention, there is provided a liquid crystal display device which is provided with the color filter substrate according to the first aspect of the present invention and exhibits a color difference Δu'v' of 0.02 or less.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a cross-sectional view schematically illustrating the color filter according to a first aspect of the present invention; and FIG. 2 is a cross-sectional view schematically illustrating one example of a liquid crystal display device according to a second aspect of the present invention.

DETAILED DESCRIPTION OF THE INVENTION

Next, various embodiments of the present invention will be explained.

In the explanation of various aspects of the present invention, the values of optical characteristics are defined as follows in the present specification.

$n_{XY}$: Average of refractive index in the case where the vibration direction of light is parallel with the surface of thin film;

$n_Z$: Refractive index in the case where the vibration direction of light is perpendicular to the surface of thin film;

d: Film thickness of thin film;

Birefringence $\Delta n = n_{XY} - n_Z$; and

Retardation in thickness direction $Rth = \Delta n \times d$.

Refractive index, birefringence and retardation in thickness direction are the values measured by using a peak wavelength of light transmitted through a thin film formed of a photosensitive color composition. Examples of such a wavelength are, for example, 610 nm in the case of a red color layer, 545 nm in the case of a green color layer, and 450 nm in the case of a blue color layer.

In the present specification, the pigment dispersion contains plural kinds of pigments, a dispersing agent (including a pigment derivative), a transparent resin and a solvent, wherein the pigments formed of solid particles are dispersed and stabilized in a liquid. Even if a pigment dispersion is formed from the same pigment composition, when the pigment dispersion is formed by employing a different kind of transparent resin or a different kind of dispersing agent, the resultant pigment dispersion is regarded as a different kind of pigment dispersion. Furthermore, the coloring composition described herein contains, in addition to the aforementioned pigment dispersion, a polyfunctional monomer, a photosensitive resin, a non-photosensitive resin, a polymerization initiator, a solvent, etc. Incidentally, an organic resins which is high in transparency and useful in the present invention such as a photosensitive resin, a non-photosensitive resin, etc. will be referred to generically as a transparent resin.

Next, the color filter substrate according to one embodiment of the present invention will be explained.

The photosensitive color composition to be employed in the formation of the color pixels of the color filter substrate according to one embodiment of the present invention contains a transparent resin, and two or more kinds of pigments, an absolute value of birefringence Δn of pigment dispersion falling within the range of 0-0.055. In the color filter substrate which is provided with color pixels each formed by employing such a photosensitive color composition, the amounts of two or more kinds of pigments are adjusted in such a manner that the absolute value of retardation in thickness direction (Rth) of each of different color pixels, which can be represented by the following equation, is enabled to fall within the range of 0-3 nm.

$$Rth = \{(Nx+Ny/2-Nz)/2-Nz\} \times d$$

wherein Nx is the refractive index in the x-direction in the plane of color pixel layer; Ny is the refractive index in the y-direction in the plane of color pixel layer; and Nz is the refractive index in the thickness direction of the color pixel layer. Herein, Nx constitutes a lagging axis represented by $Nx \geq Ny$; and d is a thickness (nm) of the color pixel layer)

Namely, it is possible to confine the absolute value of retardation in thickness direction (Rth) of each of different color layers to the range of 0-3 nm through the adjustment of the amounts of two or more kinds of pigments so as to make them fall within the ranges defined by the following conditions.

(a) The content of a pigment exhibiting less than 0.011 as an absolute value of birefringence Δn is confined to 34% by mass to 100% by mass based on a total amount of pigments in the aforementioned photosensitive color composition;

(b) (Content of pigment exhibiting less than 0.011 as an absolute value of birefringence Δn)>(Content of pigment exhibiting an absolute value of birefringence Δn not less than 0.011 and less than 0.016)≧0; and (c) (Content of pigment exhibiting 0.011 to less than 0.016 as an absolute value of birefringence Δn)≧(Content of pigment exhibiting 0.016-0.055 as an absolute value of birefringence Δn)≧0.

With the employment of the color filter substrate which is constructed as described above, it is possible to enable each of plural color pixels having a different color to exhibit a contrast of not less than 8000 as a monochrome color layer.

Further, the aforementioned plural color pixels each having a different color may be constructed such that one of them is a red pixel and two or more kinds of pigments to be contained in the photosensitive color composition for forming this red pixel are constituted by C.I. Pigment Red 254, C.I. Pigment Red 177 and C.I. Pigment Yellow 150.

Further, the aforementioned plural color pixels each having a different color may be constructed such that one of them is a red pixel and two or more kinds of pigments to be contained in the photosensitive color composition for forming this red pixel are constituted by C.I. Pigment Red 254, C.I. Pigment Red 177 and C.I. Pigment Yellow 138.

Further, the aforementioned plural color pixels each having a different color may be constructed such that one of them is a green pixel and two or more kinds of pigments to be contained in the photosensitive color composition for forming this green pixel are constituted by C.I. Pigment Green 58 and C.I. Pigment Yellow 150.

Further, the aforementioned plural color pixels each having a different color may be constructed such that one of them is a green pixel and two or more kinds of pigments to be contained in the photosensitive color composition for forming this green pixel are constituted by C.I. Pigment Green 36, C.I. Pigment Green 58 and C.I. Pigment Yellow 150.

Further, the aforementioned plural color pixels each having a different color may be constructed such that one of them is a blue pixel and two or more kinds of pigments to be contained in the photosensitive color composition for forming this blue pixel are constituted by C.I. Pigment Blue 15:6 and C.I. Pigment Violet 23.

Further, the aforementioned plural color pixels each having a different color may be constructed such that one of them is a blue pixel and two or more kinds of pigments to be contained in the photosensitive color composition for forming this blue pixel are constituted by C.I. Pigment Blue 15:6 and C.I. Pigment Violet 23. At the same time, the photosensitive color composition for forming this blue pixel may further contain a pigment derivative represented by the following chemical formula:

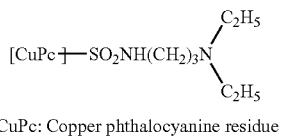

CuPc: Copper phthalocyanine residue

According to above-described one embodiment of the present invention, each of the color pixels is formed by employing pigment dispersions comprising, at prescribed amounts, a pigment exhibiting less than 0.011 as an absolute value of birefringence Δn, a pigment exhibiting 0.011 to less than 0.016 as an absolute value of birefringence Δn, and a pigment exhibiting 0.016-0.055 as an absolute value of birefringence Δn, and the absolute value of retardation in thickness direction (Rth) of each of color pixels obtained is confined to the range of 0-3 nm. Therefore, it is possible to control the retardation of color filter without inviting changes in various characteristics of color filter including the photolithographic characteristics and physical properties thereof. As a result, it is possible to obtain a color filter substrate having Rth value which is suited to a combination with other components and to a driving system of liquid crystal.

Further, since the Rth of each of color pixels can be minimized close to 0 nm, it is now possible to provide a liquid crystal display device which is excellent in viewing angle characteristics and very high in contrast. Further, it is now possible to delicately adjust the color of color pixels while making it possible to minimize the Rth of each of color pixels.

Furthermore, it is possible, through a specific selection of the amounts of pigment dispersions and a combination of pigments according to one embodiment of the present invention, to provide a liquid crystal display device capable of exhibiting not only a high contrast of not less than 8000 as monochrome color layer or a high color filter contrast of not less than 9000 but also excellent oblique visibility.

In the color filter substrate according to one embodiment of the present invention, two or more kinds of pigments may be selected from a pigment A exhibiting less than 0.011 as an absolute value of birefringence Δn, a pigment B exhibiting 0.011 to less than 0.016 as an absolute value of birefringence Δn and a pigment C exhibiting 0.016-0.055 as an absolute value of birefringence Δn, wherein the content of pigment A may be limited to 34% by mass to 100% by mass based on a total amount of the pigments in a photosensitive color composition, and the amounts of these pigments may be adjusted to: pigment A>pigment B≧pigment C.

Incidentally, by the term "two or more kinds of pigments", it may be two or more kinds of pigments selected from pigment A, pigment B and pigment C, or each of pigment A, pigment B and pigment C may be constituted by two or more kinds of pigments.

In this case, when the content of pigment A is less than 34% by mass based on a total amount of the pigments or when the amounts of these pigments fails to satisfy the aforementioned inequality, it may become difficult to confine the absolute value of retardation in thickness direction (Rth) of each of color pixels to the range of 0-3 nm.

The liquid crystal display device which is provided with the color filter substrate as defined above is capable of exhibiting a high contrast and excellent oblique visibility. If the absolute value of retardation in thickness direction (Rth) is higher than 3 nm, it may become difficult to suitably design the liquid crystal or other optical components for a liquid crystal panel which is intended to realize high image qualities, thus resulting in the deterioration of oblique visibility or of contrast.

As a result of intensive studies made by the present inventors on the photosensitive color composition to be used for forming the color pixel of color filter, it has been found out that when the birefringence of pigment dispersions is carefully examined and the amounts of the pigment dispersions are suitably adjusted to thereby make it possible to control the retardation, it is possible to obtain a photosensitive color composition exhibiting excellent properties for forming the aforementioned color filter-constituting components. Namely, the photosensitive color composition thus obtained is excellent in sensitivity and in developing properties, is capable of forming a coated film which makes it possible to regulate an absolute value of retardation in thickness direction (Rth) to fall within the range of 0-3 nm after the curing thereof by means of light irradiation and/or baking, and is also excellent in adhesion thereof to a substrate, in hardness, in solvent resistance and in alkali resistance, thereby making it possible to solve all of the aforementioned problems of the prior art.

When the absolute value of retardation in thickness direction (Rth) of the color pixel thus formed is higher than 3 nm, the oblique visibility of thereof may be deteriorated.

The birefringence of pigment, i.e. the birefringence of a thin film which is formed of a pigment dispersion film, may differ depending on the manufacturing method of the pigment or on the treatment method when the pulverization thereof. However, examples of pigment which are capable of exhibiting 0.01 or more in the value of Δn include, for example, C.I. Pigment Yellow 150, 185; C.I. Pigment Blue 15:6, etc. Examples of pigment which are capable of exhibiting not more than −0.01 in the value of Δn include, for example, C.I. Pigment Red 177, C.I. Pigment Yellow 138, etc.

Aforementioned two or more kinds of pigments may be a combination of pigments differing in spectral distribution from each other. However, it is more preferable to employ those having the same spectral distribution with each other or those having spectral distributions which are very close to each other or substantially the same with each other. By doing so, it is possible to keep constant the color of the photosensitive color composition and of the color layer (color pixel) formed of this color composition even if the amounts of two or more kinds of pigments in the pigment composition are changed in an attempt to control the retardation, thereby conveniently facilitating the design of not only the color composition but also the color filter.

Generally, the color filter substrate for a liquid crystal display device is constructed such that a black matrix is formed on a transparent substrate and color pixels of three colors, i.e. red pixels, green pixels and blue pixels are formed in regions partitioned by the black matrix. Incidentally, the color pixels may not be restricted to these three colors but may be combined with a complementary color or with a complementary color and other colors, thereby formulating a multi-color filter containing more than three colors.

Incidentally, in the case of a color filter wherein the color pixels thereof are to be formed by making use of a pigment-dispersion-type photosensitive color composition, if it is desired to obtain excellent front visibility, especially, tightened black exhibiting a high concentration of black in the display of black, the particle size distribution of the primary particle of pigment may preferably be regulated such that the particle diameter d50 which corresponds to 50% of a total of integrated amount in a cumulative curve of number particle size distribution is confined to not more than 40 nm, more preferably not more than 30 nm. When the particle diameter d50 of the primary particle of pigment is regulated so as to fall within this range, it is possible to obtain a liquid crystal display device which is excellent in visibility not only from an oblique direction but also from the front face direction.

For the formation of the red pixel, it is possible to employ red pigments such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, 279, etc. These red pigments may be employed together with a yellow pigment or an orange pigment.

Examples of the yellow pigment include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213, 214, etc.

Examples of the orange pigment include C.I. Pigment Orange 36, 43, 51, 55, 59, 61, 71, 73, etc.

In terms of the hue and luminosity of pixels, the film thickness and contrast, the amount of pigments to be used may preferably be confined, based on a total weight of pigments, to such that diketopyrrolopyrrole-based red pigment is limited to 0% by mass to 90% by mass, more preferably 10% by mass to 60% by mass, anthraquinone-based red pigment is limited to 10% by mass to 70% by mass, more preferably 34% by mass to 70% by mass. Especially in viewpoint of contrast, it is more preferable to limit diketopyrrolopyrrole-based red pigment to 25% by mass to 60% by mass and to limit anthraquinone-based red pigment to 34% by mass to 70% by mass.

Further, for the purpose of adjusting the hue, the red pixel may contain yellow pigments or orange pigments. In viewpoint of increasing the contrast however, it is more preferable to employ azo/metal complex-based yellow pigment.

The amount of these yellow pigments to be used may preferably be confined to 5% by mass to 25% by mass based on a total weight of pigments. If the amount of these yellow pigments is less than 5% by mass, it may become difficult to adjust the hue such as a sufficient increase of luminosity. On the other hand, when the amount of these yellow pigments is more than 30% by mass, the hue of the red pixel may be excessively shifted to yellowish color, thereby deteriorating the color-reproducing property.

In the formation of the red pixel as described above, it is more preferable to employ C.I. Pigment Red 254 as a diketopyrrolopyrrole-based red pigment, C.I. Pigment Red 177 as an anthraquinone-based red pigment, and C.I. Pigment Yellow 150 as an azo/metal complex-based yellow pigment in viewpoints of excellence in light resistance, heat resistance, transparency and coloring power.

With respect to green pixel, it is possible to employ green pigment such for example as C.I. Pigment Green 7, 10, 36, 37, etc. It is also possible to co-use a yellow pigment. With respect to this yellow pigment, it is possible to use almost the same kinds of pigments as described above in connection with the red pixel.

In order to facilitate the acquisition of desired value of Rth, green pixel may preferably contain at least one kind of pigment selected from halogenated metal phthalocyanine-based green pigment, azo-based yellow pigment and quinophthalone-based yellow pigment. The reason is that in the case of halogenated metal phthalocyanine-based green pigment, it is possible to control Rth (G) to a certain extent by suitably selecting the kind of central metal thereof. For example, when the central metal is constituted by copper, the value of Rth becomes a negative value. When the central metal is constituted by zinc, the value of Rth can be increased, as compared with the case where the central metal is constituted by copper, to zero to a positive value. Further, in the case of azo-based yellow pigment, it is possible to obtain a positive value of Rth (G) irrespective of the pulverizing treatment thereof. In the case of phthalocyanine-based yellow pigment, it is possible to obtain a negative value of Rth (G) irrespective of the pulverizing treatment thereof. Therefore, a desired vale of Rth can be easily obtained through the co-use of these pigments.

In the case of green pigment also, in viewpoint of obtaining desired hue and luminosity of pixels, desired film thickness and contrast, the amount of each of pigments to be used may preferably be confined, based on a total weight of pigments, to such that halogenated metal phthalocyanine-based green pigment is limited to 30% by mass to 90% by mass, azo-based yellow pigment and/or quinophthalone-based yellow pigment is limited to 0% by mass to 60% by mass, more preferably 5% by mass to 60% by mass.

It is more preferable to limit the halogenated metal phthalocyanine-based green pigment to 50% by mass to 85% by mass, to limit the azo-based yellow pigment to 5% by mass to 45 mass %, and to limit the quinophthalone-based yellow pigment to 5% by mass to 45% by mass. It is especially preferable to use halogenated metal phthalocyanine (C.I. Pigment Green 58) as a major pigment at a ratio of not less than 34% by mass.

In this case, in viewpoints of realizing excellent light resistance, heat resistance, transparency and coloring power, it is preferable to employ C.I. Pigment Green 7, 36 and 58 as the halogenated metal phthalocyanine-based green pigment, to employ C.I. Pigment Yellow 150 as the azo-based yellow pigment and C.I. Pigment Yellow 138 as the quinophthalone-based yellow pigment. When halogenated zinc phthalocyanine (C.I. Pigment Green 58) is used as a major pigment, the retardation in thickness direction Rth of green pixel can be minimized and oblique visibility thereof can be enhanced. Since green is high in luminosity factor to the eyes of viewer, the effects thereof are especially prominent.

For the formation of the blue pixel, it is possible to employ blue pigments such as C.I. Pigment Blue 15, 15:1, 15:2, 15:3, 15:4, 15:6, 16, 22, 60, 64, etc. Further, this blue pigment may be used together with a violet pigment. Specific examples of violet pigment include C.I. Pigment Violet 1, 19, 23, 27, 29, 30, 32, 37, 40, 42, 50, etc.

When the blue pixel includes metal phthalocyanine-based blue pigment and/or dioxazine-based violet pigment among the aforementioned pigments, it would become easier to obtain a Rth value ranging from a negative value to a value close to zero. With respect to the amount of using these pigments, the mixing ratio of the metal phthalocyanine-based blue pigment may be confined to 50-100% by mass and the mixing ratio of the dioxazine-based violet pigment may be confined to 0-49% by mass, preferably 1-49% by mass in viewpoints of the hue, luminosity, film thickness of the blue pixel. More preferably, the mixing ratio of the metal phthalocyanine-based blue pigment may be confined to 50-98% by mass and the mixing ratio of the dioxazine-based violet pigment may be confined to 2-25% by mass.

In viewpoints of realizing excellent light resistance, heat resistance, transparency and coloring power, the employment of C.I. Pigment Blue 15:6 as the metal phthalocyanine pigment and C.I. Pigment Violet 23 as the dioxazine-based violet pigment is preferable.

In the present invention, the pigment dispersion may be formulated so as to contain monochrome pigment, a dispersing agent (including a pigment derivative), a resin and a solvent, thereby dispersing and stabilizing the pigment formed of solid particles in a liquid. Furthermore, the photosensitive color composition to be employed in the present invention may be formulated so as to contain plural kinds of the aforementioned pigment dispersion, a polyfunctional monomer, a photosensitive resin or a non-photosensitive resin, a polymerization initiator and a solvent. The pigment dispersion to be employed for dispersing and stabilizing the pigment is required to have an adsorptive group for adsorbing the pigment and an affinity group, thereby making it possible to exhibit compatibility to a transparent resin such as a photosensitive of non-photosensitive resin to be contained in the photosensitive color composition.

(Dispersing Agent)

When dispersing the pigment in a transparent resin acting as a pigment carrier and in an organic solvent, a dispersing agent or a surfactant is required to be used for the dispersion of the pigment. With respect to the dispersing agent, it is possible to employ a surfactant, an intermediate body of coloring matter such as pigment and dye, a derivative of coloring matter, a Solsperse, etc. These dispersing agents are respectively provided with not only a pigment affinity moiety exhibiting pigment-adsorbing properties, but also another moiety exhibiting compatibility to the transparent resin, thereby enabling the dispersing agents to adsorb onto the pigment and to stabilize the dispersion of the pigment in the transparent resin. In the present invention, the derivative of coloring matter plays an important role to improve the fluidity and dispersion stability of the photosensitive color composition as well as the uniformity and contrast of a coated film formed as a color layer.

Specific examples of the dispersing agent include polyurethane, polycarboxylate such as polyacrylate, unsaturated polyamide, polycarboxylic acid, (partial) amine polycarboxylate, ammonium polycarboxylate, alkyl amine polycarboxylate, polysiloxane, long chain polyaminoamide phosphate, hydroxyl group-containing polycarboxylate and modified compounds thereof, an oily dispersing agent such as amide to be formed through a reaction between poly(lower alkyl imine) and polyester having a free carboxyl group and salts of the amide, (metha)acrylic acid-styrene copolymer, (metha)acrylic acid-(metha)acrylate copolymer, styrene-maleic acid copolymer, water-soluble resin or water-soluble macromolecular compound such as polyvinyl alcohol and poly(vinyl pyrrolidone), polyester compounds, modified polyacrylate compounds, ethylene oxide/propylene oxide adduct, phosphate, etc. These compounds may be employed individually or in combination of two or more kinds.

Although there is not any particular limitation with regard to the mixing ratio of the dispersing agent, it is preferable to incorporate the dispersing agent at a ratio of 1-10% by mass based on 100% by mass of the amount of pigments. Further, The color composition may preferably be formulated such that bulky particles 5 μm or more in size, preferably, bulky particles 1 μm or more in size, more preferably, bulky particles 0.5 μm or more in size as well as dusts intermingled therein are completely removed from the composition by making use of centrifugal separation, sintered filter, membrane filter, etc.

(Surfactants)

Examples of the surfactant include an anionic surfactant such as polyoxyethylene alkylether sulfate, dodecylbenzene sodium sulfonate, alkali salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

(Acrylic Resin)

Examples of acrylic resin are as follows.

Namely, acrylic resin includes polymers formed using monomers such for example as (metha)acrylic acid; alkyl (metha)acrylate including methyl (metha)acrylate, ethyl (metha)acrylate, propyl (metha)acrylate, butyl (metha)acrylate, t-butyl (metha)acrylate, benzyl (metha)acrylate, lauryl (metha)acrylate, etc.; hydroxyl group-containing (metha) acrylate such as hydroxyethyl (metha)acrylate, hydroxypropyl (metha)acrylate, etc.; ether-containing (metha)acrylate such as ethoxyethyl (metha)acrylate, glycidyl (metha)acrylate, etc.; and alicyclic (metha)acrylate such as cyclohexyl (metha)acrylate, isobornyl (metha)acrylate, dicyclopentenyl (metha)acrylate, etc. Incidentally, these monomers can be used singly or in combination of two or more kinds. Further, other kinds of compounds which can be co-polymerized with these monomers such as styrene, cyclohexyl maleimide, phenyl maleimide, etc. can be used as a copolymer.

It is also possible to obtain photosensitive resins through the reaction between a copolymer of carboxylic acid having an ethylenic unsaturated group such as (metha)acrylic acid and a compound having epoxy group and unsaturated double bond such as glycidyl methacrylate or through the addition of a carboxylic acid-containing compound such as (metha) acrylic acid to a polymer of epoxy group-containing (metha) acrylate such as glycidyl methacrylate or to a copolymer of epoxy group-containing (metha)acrylate with other kinds of (metha)acrylate.

It is also possible to obtain a photosensitive resin through the reaction between a polymer having hydroxyl group and constituted by a monomer such as hydroxyethyl methacrylate and a compound having an isocyanate group and an ethylenic unsaturated group such as methacryloyloxyethyl isocyanate.

Further, as described above, a resin having carboxylic group can be obtained through a reaction between a copolymer of hydroxyethyl methacrylate having a plurality of hydroxyl groups and a polybasic acid anhydride, thereby introducing carboxylic group into the copolymer. The manufacturing method thereof may not be limited to the above-described method.

Specific examples of the acid anhydride to be employed in the aforementioned reaction include, for example, malonic anhydride, succinic anhydride, maleic anhydride, itaconic anhydride, phthalic anhydride, tetrahydrophthalic anhydride, hexahydrophthalic anhydride, methyltetrahydrophthalic anhydride, trimellitic anhydride, etc.

The acid value of solid matter of above-described acrylic resin may preferably be confined to 20-180 mgKOH/g. If this acid value is less than 20 mgKOH/g, the developing rate of the photosensitive resin composition becomes too slow, thereby taking a lot of time for executing the development thereof, thus leading to the decrease of productivity. On the other hand, if the acid value of solid matter is larger than 180 mgKOH/g, the developing rate of the photosensitive resin composition becomes too fast on the contrary, thereby most likely inviting the generation of problems such as peeling of pattern after the development thereof or the chip-off of pattern.

Further, in the case where the aforementioned acrylic resin is photosensitive, the double-bond equivalent of the acrylic resin may preferably be not less than 100, more preferably 100-2000, most preferably 100-1000. If the double-bond equivalent thereof is higher than 2000, it may become difficult to secure sufficient photocuring properties.

(Photopolymerizable Monomer)

Specific examples of the photopolymerizable monomer include various kinds of acrylic esters and methacrylic esters such as 2-hydroxyethyl(metha)acrylate, 2-hydroxypropyl (metha)acrylate, cyclohexyl(metha)acrylate, polyethyleneglycol di(metha)acrylate, pentaerythritol tri(metha)acrylate, trimethylolpropane tri(metha)acrylate, dipentaerythritol hexa(metha)acrylate, tricyclodecanyl (metha)acrylate, melamine (metha)acrylate, epoxy(metha)acrylate, etc.; (metha)acrylic acid; styrene; vinyl acetate; (metha)acryl amide; N-hydroxymethyl (metha)acryl amide; acrylonitrile; etc.

Further, it is preferable to employ polyfunctional urethane acrylate having (metha)acryloyl group which can be obtained through the reaction between (metha)acrylate having hydroxyl group and polyfunctional isocyanate. Incidentally, the combination between the (metha)acrylate having hydroxyl group and polyfunctional isocyanate may be optionally selected and hence there is not any particular limitation. Further, only one kind of polyfunctional urethane acrylate may be used singly or polyfunctional urethane acrylate may be used in a combination of two or more kinds thereof.

(Photopolymerization Initiators)

Specific examples of the photopolymerization initiator include an acetophenone-based compound such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-benzyl-2-diamino-1-(4-morpholinophenyl)-butan-1-one; a benzoin-based compound such as benzoin, benzoin methyl ether, benzoin ethyl ether, benzoin isopropyl ether, benzyldimethyl ketal, etc.; a benzophenone-based compound such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based compound such as thioxanthone, 2-chlorothioxanthone, 2-methylthioxanthone, isopropylthioxanthone, 2,4-diisopropylthioxanthone, etc.; a triazine-based compound such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis (trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis (trichloromethyl)-s-triazine, 2,4-trichloromethyl-(piperonyl)-6-triazine, 2,4-trichloromethyl(4'-methoxystyryl)-6-triazine, etc.; an oxime ester-based compound such as 1,2-octanedione, 1-[4-(phenylthio)-2-(O-benzoyloxime)], O-(acetyl)-N-(1-phenyl-2-oxo-2-(4'-methoxynaphthyl)ethylidene)hydroxyl amine, etc.; a phosphine-based compound such as bis(2,4,6-trimethylbenzoyl) phenylphosphine oxide, 2,4,6-trimethylbenzoyl diphenylphosphine oxide, etc.; a quinone-based compound such as 9,10-phenanthrene quinone, camphor quinone, ethyl anthraquinone, etc.; a borate-based compound; a carbazolbased compound; an imidazole-based compound, a titanocene-based compound, etc.

These photopolymerization initiators can be employed singly or in combination of two or more kinds thereof.

(Photosensitizer)

It is preferable to use these photopolymerization initiators in combination with a photosensitizer. Specific examples of the photosensitizer include α-acyloxy ester, acylphosphine oxide, methylphenyl glyoxylate, benzyl, 9,10-phenanthrene quinone, camphor quinone, ethylanthraquinone, 4,4'-diethyl isophthalophenone, 3,3',4,4'-tetra(t-butyl peroxycarbonyl) benzophenone, 4,4'-diethyl aminobenzophenone, etc.

These sensitizers can be incorporated at a ratio of 0.1 to 60 parts by mass based on 100 parts by mass of the photopolymerization initiator.

(Non-Photosensitive Resin and/or Photosensitive Resin)

The transparent resin which is useful in the present invention may include a non-photosensitive transparent resin and/or a photosensitive transparent resin preferably exhibiting a permeability of not less than 80%, more preferably not less than 95% in a total wavelength range of 400-700 nm of visible light zone.

Specific examples of the transparent resin include thermoplastic resin, thermosetting resin and photosensitive resin. Examples of the thermoplastic resin include, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber-type resin, cyclized rubber-based resin, celluloses, polybutadien, polyethylene, polypropylene, polyimide, etc. Examples of the thermosetting resin include, for example, epoxy resin, benzoguanamine resin, rosin-modified maleic resin, rosin-modified fumaric acid resin, melamine resin, urea resin, phenol resin, etc. It is also possible to employ, as thermosetting resin, compounds to be obtained through a reaction between melamine resin having a formula described below and a compound having isocyanate group. Specific examples of the melamine resin include the compounds having a formula (2) shown below and polymers thereof.

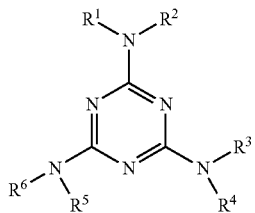

(wherein $R^1$-$R^6$ may be the same or different and are individually hydrogen atom or $CH_2OR$ [R is hydrogen atom or alkyl group and may be the same or different in $R^1$-$R^6$])

It is also possible to co-use two or more kinds of homopolymers or copolymers. It is also possible to use, other than the above-described compounds, a compound having 1,3,5-triazine ring which is shown in JP-A 2001-166144. It is also possible to preferably use the compounds represented by the following formula (3).

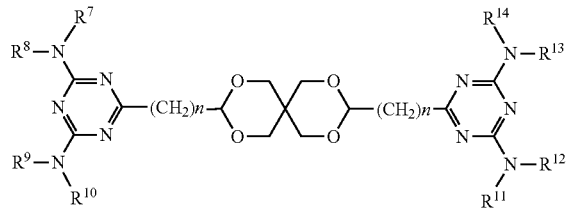

(wherein $R^7$-$R^{14}$ may be the same or different and are individually hydrogen atom, alkyl group, alkenyl group, aryl group or heterocyclic group; hydrogen atom being most preferable among these groups)

Specific examples of the compound having isocyanate group and being useful in the aforementioned reaction include various kinds of known isocyanates such as aromatic, aliphatic or alicyclic isocyanates.

For example, it is possible to employ aromatic polyisocyanate such as 1,5-naphthylene diisocyanate, 4,4'-diphenyl methane diisocyanate, 4,4'-diphenyldimethyl methane diisocyanate, 4,4'-dibenzyl diisocyanate, dialkyldiphenyl methane diisocyanate, tetraalkyldiphenyl methane diisocyanate, 1,3-phenylene diisocyanate, 1,4-phenylene diisocyanate, tolylene diisocyanate, xylylene diisocyanate, m-tetramethyl xylylene diisocyanate, etc.; aliphatic polyisocyanate such as butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, etc.; alicyclic polyisocyanate such as cyclohexane-1,4-diisocyanate, isophorone diisocyanate, lysine diisocyanate, dicyclohexylmethane-4,4'-diisocyanate, 1,3-bis(isocyanate methyl)cyclohexane, methylcyclohexane diisocyanate, etc.; and dimer diisocyanate wherein carboxyl group of dimer acid is converted to isocyanate group.

When it is desired to impart photosensitivity to the thermosetting resin, a compound having isocyanate group and a double-bonding group can be suitably employed. Examples of such a compound include 2-acryloyloxyethyl isocyanate, 2-methacryloyloxyethyl isocyanate, 1,1'-(bisacryloyloxymethyl)ethyl isocyanate, etc.

Examples of an acid anhydride to be used in the aforementioned reaction include malonic anhydride, succinic anhydride, maleic anhydride, itaconic anhydride, phthalic anhydride, hexahydrophthalic anhydride, tetrahydrophthalic anhydride, methyltetrahydrophthalic anhydride, etc.

In this thermosetting resin, the acid value thereof may preferably be confined, as reduced based on solid matter, to 3-60 mgKOH/g, more preferably 20-50 mgKOH/g. Accordingly, the addition reaction of the acid anhydride is performed quantitatively so as to confine the acid value to fall within this range.

If this acid value is less than 3 mgKOH/g, defective development may be caused to occur in the alkali-developing process. On the other hand, if this acid value is larger than 60 mgKOH/g, various problems may be caused to occur such as invasion of the surface of exposure portions by a developing solution in the process of alkali-development or deterioration of long-term storage stability of the photosensitive resin composition. The aforementioned thermosetting resin can be prepared according any one of the following methods.

(1) A method wherein melamine resin is mixed and reacted with a compound having isocyanate group while warming the mixture.

(2) A method wherein melamine resin is mixed and reacted with a compound having isocyanate group while warming the mixture and then an acid anhydride is added thereto and allowed to react with the mixture while warming the mixture.

(3) A method wherein melamine resin is mixed and reacted with an acid anhydride while warming the mixture.

These methods may further include, as pretreatments, a step of vaporizing low-boiling alcohol compounds by an evaporator and a step of solvent replacement using another solvent which is suited for the photosensitive resin composition.

Generally speaking, thermosetting resins such as melamine resin are high in thermal reactivity and poor in long-term storage stability, so that it has been considered difficult to incorporate a large amount of thermosetting resin in the photosensitive resin composition. In the case of the aforementioned thermosetting resins however, since some of a plurality of thermally reactive groups existing in the skeleton of melamine resin are consumed for the reaction thereof with a compound or acid anhydride having isocyanate group, the thermal reactivity thereof is appropriately reduced, thereby making them effective in improving the long-term storage stability of the photosensitive resin composition. Furthermore, as a result of the reaction of melamine resin with a compound or acid anhydride having isocyanate group, the polymer chain of melamine resin is elongated to restrain the free movement of the skeleton of melamine resin, thereby bringing about advantages of improving the storage stability thereof.

By way of the reaction of melamine resin with a compound or acid anhydride having isocyanate group, it is possible to impart alkali-developing property and/or photosensitivity, both required in an alkali-developing-type photosensitive resin composition, to the melamine resin. By providing the melamine resin with alkali-developing property and/or photosensitivity, the adhesion thereof to a substrate can be improved, thereby realizing a photosensitive resin composition which is excellent in process margin, making it possible to prevent the generation of problems in the step of development.

Furthermore, due to the inclusion of the aforementioned thermosetting resin in the photosensitive resin composition, it is not only possible to impart a sufficient heat resistance and hardness to a coated film that has been cured but also possible to impart solvent resistance and alkali resistance to the coated film.

Additionally, when an appropriate amount of the thermosetting resin is incorporated in the photosensitive resin composition, it is not only possible to minimize the elution of ionic impurities which are contained in pigments or in other kinds of particulate and/or which are intruded into the photosensitive resin composition during the manufacture of the photosensitive resin composition but also possible to improve the electrical characteristics of the photosensitive resin composition.

Furthermore, when an appropriate amount of the thermosetting resin is incorporated in the photosensitive resin composition, the aromatic ring of the thermosetting resin is enabled to act electronically, thus making it possible to adjust the electrical characteristics of the cured film. As a result, it is now possible to provide a liquid crystal display device which is excellent in electrical characteristics and is free from image persistence and color shift even if the display device is used for long hours.

(Polyfunctional Thiol)

The photosensitive resin composition may contain polyfunctional thiol which is capable of acting as a chain-transfer agent. The polyfunctional thiol is useful as long as the compound thereof has two or more thiol groups. Specific examples of the polyfunctional thiol include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc.

These polyfunctional thiols can be employed singly or in combination of two or more kinds. The content of these polyfunctional thiols may preferably be confined to 0.2-150 parts by mass, more preferably 0.2-100 parts by mass based on 100 parts by mass of the pigment in the color composition.

(Storage Stabilizing Agent)

The photosensitive resin composition may further contain a storage stabilizing agent for stabilizing the time viscosity of the composition. Specific examples of the storage stabilizing agent include, for example, quaternary ammonium chlorides such as benzyltrimethyl chloride, diethylhydroxy amine, etc.; organic acids such as lactic acid, oxalic acid, etc. and methyl ethers thereof; t-butyl pyrocatechol; organic phosphine such as triethyl phosphine, triphenyl phosphine, etc.; phosphite; etc. The storage stabilizing agent can be employed at a ratio of 0.1-10 parts by mass based on 100 parts by mass of the pigments in a photosensitive color composition.

(Adherence Improver)

Further, the photosensitive resin composition may contain an adherence improver such as a silane coupling agent for the purpose of enhancing the adhesion thereof to a substrate. Specific examples of the silane coupling agent include vinyl silanes such as vinyl tris(β-methoxyethoxy)silane, vinylethoxy silane, vinyltrimethoxy silane, etc.; (metha)acrylsilanes such as γ-methacryloxypropyl silane, etc.; epoxy silanes such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc. These silane coupling agents can be incorporated at a ratio of 0.01-100 parts by mass based on 100 parts by mass of the pigments in a coloring composition.

(Solvents)

The photosensitive color composition may further contain a solvent such as water, organic solvents, etc. for enabling the photosensitive resin composition to be uniformly coated on the surface of a substrate. Further, in the case where the photosensitive resin composition of the present invention is to be used for constituting the color layer of color filter, the solvent acts to enable pigments to be uniformly dispersed in the color layer. Specific examples of the solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds. The mixing ratio of these solvents may be confined to the range of 800 to 4000 parts by mass, preferably 1000 to 2500 parts by mass based on 100 parts by mass of the pigments in the color composition.

(Method of Preparing the Photosensitive Resin Composition)

The photosensitive color composition can be prepared by way of any conventional method. For example, a photosensitive color composition containing a photopolymerizable monomer, a thermosetting resin, a pigment, a dispersing agent and a solvent may be prepared according to the following methods.

(1) A pigment composition that has been prepared in advance through the mixing of a pigment with a dispersing agent is added to and dispersed in a photopolymerizable monomer and in the thermosetting resin of the present invention or in a solution comprising these components dissolved in a solvent. Then, residual components are added to the resultant dispersion.

(2) A pigment and a dispersing agent are separately added to and dispersed in a photopolymerizable monomer and in the thermosetting resin of the present invention or in a solution comprising these components dissolved in a solvent. Then, residual components are added to the resultant dispersion.

(3) A pigment is added to and dispersed in a photopolymerizable monomer and in the thermosetting resin of the present invention or in a solution comprising these components dissolved in a solvent. Then, a dispersing agent is added to the resultant dispersion and then residual components are added to the resultant dispersion.

(4) Two kinds of materials each comprising a photopolymerizable monomer and the thermosetting resin of the present invention or two kinds of solutions each comprising these components dissolved in a solvent are prepared in advance and then a pigment and a dispersing agent are separately dispersed in aforementioned two kinds of materials. Then, these dispersions are mixed together and then residual components are added to the resultant dispersion. Incidentally, either the pigment or the dispersing agent may be dissolved only in the solvent.

Herein, the dispersion of the pigment and the dispersing agent in a photopolymerizable monomer and in the thermosetting resin of the present invention or in a solution comprising these components dissolved in a solvent may be performed by making use of various kinds of dispersing apparatus such as a triple roll mill, a twin-roll mill, a sand mill, a kneader, a dissolver, a high-speed mixer, a homomixer, an attritor, etc. Further, in order to execute the dispersion more preferably, the dispersion may be performed by the addition of various kinds of surfactant.

In the preparation of a pigment composition through the preliminary mixing of a pigment with a dispersing agent, it may be performed by simply mixing a powdery pigment with a powdery dispersing agent. However, it is more preferable to employ the following mixing methods, i.e. (a) a mechanical mixing method using various kinds of grinders such as a kneader, a roll, an attritor, a super mill, etc.; (b) a method wherein a pigment is dispersed in a solvent to obtain a dispersion to which a solution containing a dispersing agent is added, thereby enabling the dispersing agent to be adsorbed onto the surface of pigment; and (c) a method wherein a pigment and a dispersing agent are co-dissolved in a solvent exhibiting a strong dissolving power such as sulfuric acid and then co-precipitation is executed by making use of a poor solvent such as water, etc. The mixing and dispersion of pigment derivatives may be performed when the mixing of the pigment dispersion or when forming a resist as a photosensitive color composition.

(Color Filter)

Next, a method for forming the color layer for color filter will be explained. In the present invention, pixel units which are constituted by a red layer, a green layer or a blue layer, each disposed in the openings of black matrix, will be referred to as a red pixel, a green pixel and a blue pixel, respectively.

FIG. 1 is a cross-sectional view schematically illustrating the color filter substrate according to one embodiment of the present invention.

As shown in FIG. 1, a black matrix 2 which is obtained by patterning a layer of metal such as chromium or a photosensitive black resin composition is formed on the surface of a substrate 1 according to a conventional method. With respect to the substrate 1 to be employed herein, it is preferable to use a transparent substrate such as a glass substrate or a resinous substrate made of polycarbonate, poly-methyl methacrylate, polyethylene phthalate, etc. Further, for the purpose of driving the liquid crystal after the fabrication of a liquid crystal panel, a transparent electrode consisting of a combination of metal oxides such as indium oxide, tin oxide, zinc oxide and antimony oxide may be formed on the surface of a glass plate or of a resinous plate.

The formation of the color pixel is performed as follows. First of all, by means of spray coating, spin coating, roll coating, etc., the aforementioned photosensitive resin composition is uniformly coated on regions partitioned by a black matrix formed on the surface of the substrate 1 and then dried. Then, by means of photolithography, the photosensitive color composition layer thus formed is subjected to a patterning process. Namely, the photosensitive color composition layer is exposed to the irradiation of an active energy beam such as ultraviolet rays, electron beam, etc. through a photomask having a desired light-shielding pattern and then the resultant photosensitive color composition layer is subjected to a developing process by making use of a developing solution such as an organic solvent or an alkali aqueous solution. In this exposure process, the photopolymerizable monomer contained in the photosensitive color composition and located on the regions irradiated with the active energy beam is allowed to polymerize and cure. Further, when the photosensitive color composition contains a photosensitive resin, this photosensitive resin is also allowed to cross-link and cure.

Further, in order to enhance the exposure sensitivity, a water-soluble or alkali-soluble resin (for example, polyvinyl alcohol or a water-soluble acrylic resin) may be coated, prior to the step of exposure, on the surface of the coated photosensitive color composition layer and dried, thereby forming a film which is capable of suppressing the effects of oxygen to obstruct the polymerization.

In the step of the development, the portions of the photosensitive resin composition layer which are not irradiated with the active energy beam are washed out by making use of a developing solution to obtain a desired pattern. The method of developing treatment that can be employed includes a shower developing method, a spray developing method, a dip developing method, a paddle developing method, etc. Incidentally, with respect to the developing solution, an alkali developing solution such as an aqueous solution of sodium carbonate, sodium hydroxide, etc. or an organic alkaline solution such as dimethylbenzyl amine, triethanol amine, etc. may be mainly employed. Further, if required, the developing solution may contain a defoaming agent or a surfactant.

The same procedures as described above are repeated for other colors, thus manufacturing a color filter. More specifically, as shown in FIG. 1, red pixel 3R, green pixel 3G and blue pixel 3B are formed on the regions partitioned by the black matrix 2 formed on the surface of substrate 1. Thus, the color layer is constituted by these red pixel 3R, green pixel 3G, blue pixel 3B and the black matrix 2.

Moreover, in order to make uniform and regulate the cell gap of liquid crystal display device, a spacer may be formed on these color pixels. The spacer may preferably be formed on the locations corresponding to the black matrix.

Next, there will be explained about the liquid crystal display device which is provided with the color filter explained above.

FIG. 2 is a cross-sectional view schematically illustrating the liquid crystal display device according to the second aspect of the present invention.

The liquid crystal display device 4 shown in FIG. 2 illustrates a typical example of a TFT-drive-type liquid crystal display device which is provided with a pair of transparent substrates arranged face to face with a gap interposed therebetween and filled with a liquid crystal (LC).

With respect to the liquid crystal (LC) to be employed in the present invention, various kinds of liquid crystal can be employed such as twisted nematic (TN), super twisted nematic (STN), in-plane switching (IPS), vertical alignment (VA), optically compensated birefringence (OCB), etc. It is also possible to employ a liquid crystal-driving method called fringe field switching (FFS) wherein the transparent electrode (pixel electrode) disposed on the surface of color filter or on the substrate side having a TFT formed thereon is formed into a comb-like or stripe-like configuration.

On the inner wall of the first transparent substrate 6, there is formed a color filter 11. The red pixels, green pixels and blue pixels constituting the color filter 11 are separated from each other by a black matrix (not shown). If required, a transparent protective film (not shown) may be formed so as to cover the color filter 11. Furthermore, a transparent electrode layer 12 made of a conductive composite oxide is formed on this protective film. An alignment layer 13 is deposited so as to cover the transparent electrode layer 12. Incidentally, specific examples of the conductive composite oxide include a transparent metal oxide such as indium oxide-tin oxide-based material (ITO) and zinc oxide-based material.

On the other hand, on the inner wall of the second transparent substrate 5, there is formed a thin-film transistor (TFT) array 7 is formed. Furthermore, a transparent electrode layer 8 made of ITO for example is formed on the TFT array 7. On the surface of the transparent electrode layer 8, there is disposed an alignment layer 9. Further, a polarizing plate 14 comprising a retardation film as a component thereof is formed on the outer surface of the transparent substrate 6. Further, a polarizing plate 10 is formed on the outer surface of the transparent substrate 5. Incidentally, a back light unit 16 equipped with a triple wavelength lamp 15 is disposed below the polarizing plate 10.

EXAMPLES

Although the present invention will be specifically explained below by referring to specific examples of the present invention and to comparative examples, it may not be construed that the present invention is limited to these examples. Further, since the materials to be employed in these examples are very sensitive to light, it is required to prevent the sensitization of the materials by redundant light such as natural light and hence, every works will be performed under the yellow or red lamp. Incidentally, "part(s)" in the following examples and comparative examples means "mass part(s) or weight part(s)". Further, the symbols of pigments are indicated by a color index number. For example, "PG36" means "C.I. Pigment Green 36", and "PY150" means "C.I. Pigment Yellow 150".

Pigment derivatives used in Examples are shown in the following Table 1.

TABLE 1

| Pigment derivative | Chemical structure |
|---|---|
| D-1 | [diketopyrrolopyrrole with two phenyl groups]—[SO$_2$NH(CH$_2$)$_3$N(CH$_3$)$_2$]$_{n-1-2}$ |
| D-2 | [anthraquinone-based structure with triazine groups bearing NH(CH$_2$)$_3$N(C$_2$H$_5$)$_2$ substituents] |

TABLE 1-continued

| Pigment derivative | Chemical structure |
|---|---|
| D-3 | (structure shown) |
| D-4 | [CuPc]—SO$_2$NH(CH$_2$)$_3$N(C$_2$H$_5$)$_2$ |

CuPc: Copper phthalocyanine residual group a) Manufacture of Pulverized Pigments The pulverized pigments used in Examples and Comparative Examples were manufactured according to the following methods. An average primary particle diameter of the pigments thus obtained was measured according to an ordinary method wherein the size of primary particle was directly measured from the electron microscopic photograph thereof.

More specifically, by making use of a transmission electron microscope (JEM-2010; Nippon Denshi Co., Ltd.), the particles inside a view-field were photographed and then the minor axial length and major axial length of the primary particle of each of pigments constituting an aggregate appearing on the two-dimensional image thereof were measured. Then, an average of the measured values was taken to determine the particle diameter of pigment particles.

Then, not less than 100 particles of pigment were respectively measured respectively with respect to the volume (weight) thereof in the assumption that each of particles was constituted by a rectangular allelepiped having the previously determined particle diameter, thus determining an average primary particle diameter based on the volume average particle diameter thus measured. On this occasion, the color composition employed as a sample was ultrasonically dispersed in a solvent before the particles thereof were photographed by means of the aforementioned microscope. Incidentally, the same results would be obtained irrespective of the types of electron microscope, i.e. a transmission type (TEM) or a scanning type (SEM). The primary particle diameter herein represents a particle diameter (a diameter equivalent to circle) which corresponds to 50% of a total of integrated amount in a cumulative curve of number particle size distribution.

Pigment-Manufacturing Example 1

100 parts of a diketopyrrolopyrrole-based red pigment PR254 (Ciba Speciality Chemicals Co., Ltd.; Irgaphor Red B-CF; R-1), 18 parts of a pigment derivative (D-1), 1000 parts of ground common salt and 120 parts of diethylene glycol were put into a one-gallon stainless steel kneader (Inoue Seisakusho Co., Ltd.) and kneaded for 10 hours at a temperature of 60° C.

The resultant mixture was then introduced into 2000 parts of hot water and stirred for about one hour by means of a high-speed mixer while heating it at a temperature of about 80° C. to obtain a slurry product. This slurry product was then repeatedly subjected to filtration and water washing to remove the common salt and the solvent and dried for 24 hours at a temperature of 80° C. to obtain 115 parts of a salt milling-treated pigment (R-2). The primary particle diameter of the pigment thus obtained is shown in the following Table 2.

Pigment-Manufacturing Example 2

100 parts of an anthraquinone-based red pigment PR177 (Ciba Speciality Chemicals Co., Ltd.; Cromophtal Red A2B), 8 parts of a pigment derivative (D-2), 700 parts of ground common salt and 180 parts of diethylene glycol were put into a one-gallon stainless steel kneader (Inoue Seisakusho Co., Ltd.) and kneaded for 4 hours at a temperature of 70° C. The resultant mixture was then introduced into 4000 parts of hot water and stirred for about one hour by means of a high-speed mixer while heating it at a temperature of about 80° C. to obtain a slurry product. This slurry product was then repeatedly subjected to filtration and water washing to remove the common salt and the solvent and dried for 24 hours at a temperature of 80° C. to obtain 102 parts of a salt milling-treated pigment (R-3). The primary particle diameter of the pigment thus obtained is shown in the following Table 2.

Pigment-Manufacturing Example 3

170 parts of tert-amyl alcohol was introduced into a sulfonation flask under a nitrogen gas atmosphere. To this amyl alcohol, 11.04 parts of sodium was added to obtain a mixture, which was then heated at 92-102° C. The resultant mixture was kept all night at a temperature of 100-107° C. while agitating the fused sodium.

44.2 parts of 4-chlorobenzonitrile and 37.2 parts of diisopropyl succinate were dissolved in 50 parts of tert-amyl alcohol at 80° C. to obtain a solution, which was then added, taking two hours, to the aforementioned mixture at 80-98° C. to obtain a reaction mixture. This reaction mixture was further agitated for 3 hours at 80° C. and, at the same time, 4.88 parts of diisopropyl succinate was added dropwise to this reaction mixture. The resultant reaction mixture was cooled down to room temperature and then added to a mixture kept at a temperature of 20° C. and consisting of 270 parts of methanol, 200 parts of water and 48.1 parts of concentrated sulfuric acid. The resultant mixture was stirred for 6 hours at 20° C. to obtain a red mixture. This red mixture was then subjected to filtration and the residual matter was washed with methanol and water. This residual matter was then dried at 80° C. to obtain 46.7 parts of a red pigment (R-4). The primary particle diameter of this diketopyrrolopyrrole-based red pigment is shown in the following Table 2.

Pigment-Manufacturing Example 4

120 parts of a halogenated copper phthalocyanine-based green pigment PG36 (Toyo Ink Manufacturing Co.; Lionol Green 6YK), 1600 parts of ground common salt and 270 parts of diethylene glycol were put into a one-gallon stainless steel kneader (Inoue Seisakusho Co., Ltd.) and kneaded for 12 hours at 70° C.

The resultant mixture was then introduced into 5000 parts of hot water and stirred for about one hour by means of a high-speed mixer while heating it at a temperature of about 70° C. to obtain a slurry product. This slurry product was then repeatedly subjected to filtration and water washing to remove the common salt and the solvent and dried for 24 hours at a temperature of 80° C. to obtain 117 parts of a salt milling-treated pigment (G-1). The primary particle diameter of the pigment thus obtained is shown in the following Table 2.

Pigment-Manufacturing Example 5

46 parts of zinc phthalocyanine was dissolved in a fused salt heated to 200° C. and consisting of 356 parts of aluminum chloride and 6 parts of sodium chloride and the resultant mixture was cooled down to 130° C. After being stirred for one hour, the reaction temperature of the mixture was raised to 180° C. and bromine was added dropwise to the mixture at a dropping rate of 10 parts per hour taking 10 hours. Subsequently, chlorine was further added to the mixture at a dropping rate of 0.8 parts per hour taking 5 hours.

The resultant reaction solution was gradually introduced into 3200 parts of water and then subjected to filtration and water-washing to obtain 107.8 parts of crude halogenated zinc phthalocyanine pigment. An average number of bromination contained in one molecule of the crude halogenated zinc phthalocyanine pigment was 14.1 and an average number of chlorination contained therein was 1.9. Incidentally, this example is not intended to restrict the number of bromination.

120 parts of the crude halogenated zinc phthalocyanine pigment, 1600 parts of ground common salt and 270 parts of diethylene glycol were put into a one-gallon stainless steel kneader (Inoue Seisakusho Co., Ltd.) and kneaded for 12 hours at 70° C.

The resultant mixture was then introduced into 5000 parts of hot water and stirred for about one hour by means of a high-speed mixer while heating it at a temperature of about 70° C. to obtain a slurry product. This slurry product was then repeatedly subjected to filtration and water washing to remove the common salt and the solvent and dried for 24 hours at a temperature of 80° C. to obtain 117 parts of a salt milling-treated pigment (G-2). The primary particle diameter of the pigment thus obtained is shown in the following Table 2.

Pigment-Manufacturing Example 6

160 parts of the yellow pigment (C.I. Pigment Yellow 138; BASF Co., Ltd.; Pariotol Yellow K0961HD), 1600 parts of sodium chloride and 270 parts of diethylene glycol were put into a one-gallon stainless steel kneader (Inoue Seisakusho Co., Ltd.) and kneaded for 15 hours at 60° C. The resultant mixture was then introduced into 5000 parts of hot water and stirred for about one hour by means of a high-speed mixer while heating it at a temperature of about 70° C. to obtain a slurry product. This slurry product was then repeatedly subjected to filtration and water washing to remove the sodium chloride and the diethylene glycol and dried for 24 hours at a temperature of 80° C. to obtain 157 parts of a salt milling-treated pigment (Y-1). The primary particle diameter of the pigment thus obtained is shown in the following Table 2.

Pigment-Manufacturing Example 7

150 parts of water was put into a separable flask and then 63 parts of 35% hydrochloric acid was put into the separable flask with stirring to prepare a solution of hydrochloric acid. Then, while taking care of the generation of foaming, 38.7 parts of benzenesulfonyl hydrazide was poured into the solution and then ice was added to the resultant solution until the liquid temperature of the resultant solution was cooled down to not higher than 0° C. After this cooling step, 19 parts of sodium nitrite was put into the resultant solution taking 30 minutes and stirred for 30 minutes at a temperature ranging from 0 to 15° C. Thereafter, sulfamic acid was added to the resultant solution until the coloring of a potassium iodide-starch paper was no longer admitted.

Then, after the addition of 25.6 parts of barbituric acid to the resultant solution, the temperature thereof was raised to 55° C. and stirred at this temperature for two hours. Then, 25.6 parts of barbituric acid was further added to the resultant solution and heated up to 80° C. Then, sodium hydroxide was gradually added to the resultant solution until the pH thereof became 5. After being stirred for 3 hours at 80° C., the temperature of the solution was allowed to cool down to 70° C. and then subjected to filtration and hot-water washing.

The press-cake thus obtained was poured into 1200 parts of hot water to form a slurry, which was then stirred for two hours at 80° C. Thereafter, while keeping the temperature, the slurry was subjected to filtration and to hot-water washing using 2000 parts of hot water of 80° C., thereby confirming the movement of benzenesulfone amide to the filtrate thus obtained. The press-cake thus obtained was then dried at 80° C., thus obtaining 61.0 parts of disodium azobarbiturate.

Then, 200 parts of water was put into a separable flask and then 8.1 parts of disodium azobarbiturate powder thus obtained was put into the separable flask with stirring to disperse the powder. After being uniformly dispersed, the resultant solution was heated up to 95° C. and mixed with 5.7 parts of melamine and 1.0 parts of diallylamino melamine to obtain a mixed solution.

Further, 6.3 parts of cobalt(II) chloride hexahydrate was dissolved in 30 parts of water to obtain a green solution, which was then added dropwise to the aforementioned mixed solution over 30 minutes. After finishing the addition of the green solution, the resultant solution was subjected to complexation for 1.5 hours at 90° C.

Subsequently, the pH of the resultant solution was adjusted to 5.5 and then 20.4 parts of an emulsion-like solution consisting of 4 parts of xylene, 0.4 parts of sodium oleate and 16 parts of water, which were agitated in advance, was added to the pH-adjusted solution and agitated under heating for 4 hours. After being cooled down to 70° C., the solution was immediately subjected to filtration and to repeated water washing using water of 70° C. until the inorganic salts was completely washed.

Thereafter, the product thus obtained was subjected to the steps of drying and grinding to obtain 14 parts of azo-based yellow pigment (Y-2). The primary particle diameter of the pigment thus obtained is shown in the following Table 2.

Pigment-Manufacturing Example 8

100 parts of a halogenated copper phthalocyanine-based blue pigment PB15:6 (Toyo Ink Manufacturing Co.; Lionol Blue ES), 800 parts of ground common salt and 100 parts of diethylene glycol were put into a one-gallon stainless steel kneader (Inoue Seisakusho Co., Ltd.) and kneaded for 12 hours at 70° C.

The resultant mixture was then introduced into 3000 parts of hot water and stirred for about one hour by means of a high-speed mixer while heating it at a temperature of about 70° C. to obtain a slurry product. This slurry product was then repeatedly subjected to filtration and water washing to remove the common salt and the solvent and dried for 24 hours at a temperature of 80° C. to obtain 98 parts of a salt milling-treated pigment (B-1). The primary particle diameter of the pigment thus obtained is shown in the following Table 2.

Pigment-Manufacturing Example 9

300 parts of Lionogen Violet RL (Toyo Ink Manufacturing Co.) was mixed with 3000 parts of 96% sulfuric acid and agitated for one hour. Then, the resultant mixture was poured into water of 5° C. After being agitated for one hour, the mixture was repeatedly subjected to filtration and hot-water washing until the washing liquid became neutral. Thereafter, the residue was dried at 70° C. 120 parts of the acid pasting-treated pigment thus obtained, 1600 parts of sodium chloride and 100 parts of diethylene glycol (Tokyo Kasei Co., Ltd.) were put into a one-gallon stainless steel kneader (Inoue Seisakusho Co., Ltd.) and kneaded for 18 hours at 90° C. The resultant mixture was then introduced into 5000 parts of hot water and stirred for about one hour by means of a high-speed mixer while heating it at a temperature of about 70° C. to obtain a slurry product. This slurry product was then subjected to filtration and water washing to remove the sodium chloride and the diethylene glycol and dried for 24 hours at a temperature of 80° C. to obtain 118 parts of a salt milling-treated pigment (V-1).

TABLE 2

| Color | Symbols | Average primary particle diameter (nm) |
|---|---|---|
| RED | R-1 | 68.8 |
|  | R-2 | 24.8 |
|  | R-3 | 78.5 |
|  | R-4 | 23.2 |
| GREEN | G-1 | 22.4 |
|  | G-2 | 24.3 |
| YELLOW | Y-1 | 31.2 |
|  | Y-2 | 25.2 |
| BLUE | B-1 | 28.3 |
| VIOLET | V-1 | 26.4 | b) Preparation of a Solution of Acrylic Resin 800 g of cyclohexanone was poured into a reaction vessel and then, while continuing the blowing of nitrogen gas into the reaction vessel, the cyclohexanone was heated up to 100° C. Then, while keeping this temperature, a mixture comprising the monomers and a thermal polymerization initiator described below was added dropwise to the cyclohexanone taking one hour, thereby allowing a polymerization reaction to take place.

| | |
|---|---|
| Styrene | 70.0 parts |
| Methacrylic acid | 10.0 parts |
| Methyl methacrylate | 65.0 parts |
| Butyl methacrylate | 65.0 parts |
| Azobis-isobutyronitrile | 10.0 parts |

After finishing the dropwise addition, the reaction of the resultant mixture was allowed to take place for three hours at 100° C. Then, 2.0 parts of azobis-isobutyronitrile dissolved in 50 parts of cyclohexanone was added to the mixture, thereby allowing the reaction to take place additionally for one hour at 100° C. to synthesize a solution of resin.

After being cooled down to room temperature, 2 g of the solution of resin was taken up as a sample and heated to dry for 20 minutes at 180° C. Then, nonvolatile matters was measured and, based on this measurement, cyclohexanone was added appropriately to the previously synthesized solution of resin so as to prepare a solution of acrylic resin containing 20% of nonvolatile matters.

c) Measurement of Birefringence Δn

Samples of pigment dispersions shown in the following Table 3 were used for the measurement of birefringence. Each of the samples of pigment dispersions was coated on the surface of a glass substrate so as to obtain a 1-μm-thick coated film, which was then dried and baked for 30 minutes at 230° C. A retardation Δ(λ) was measured from the direction which was angled by 45° from the normal direction of substrate having the pigment dispersion sample coated film formed thereon. Then, based on the three-dimensional refractive index to be obtained from this value, a birefringence Δn was calculated according to the following equation. By making use of a spectroellipsometer (M-220; Nippon Bunkou Co., Ltd.), Nx, Ny and Nz were measured and the Δn was calculated according to the following equation. In this case, a wavelength of 610 nm was employed for the measurement of the red pixel, a wavelength of 550 nm was employed for the green pixel and a wavelength of 450 nm was employed for the blue pixel. Incidentally, the pigment dispersion sample was formed of a monochromic pigment dispersion, which was prepared for the purpose of the measurement of birefringence. In the present invention, the birefringence of the pigment was of the birefringence Δn which was obtained from the pigment dispersion sample and based on the aforementioned measurement.

$$Rth = \{(Nx+Ny)/2 - Nz\} \times d$$

$$\Delta n = n_{XY} - n_Z$$

(wherein $n_{XY}$ is an average in-plane refractive index; and $n_Z$ is the refractive index in the thickness direction)

The values thus obtained are shown in the following Table 3.

Incidentally, although RS-1, RS-2 and RS-4 were formed all using diketopyrrolopyrrole representing the same red pigment, since the manufacturing method thereof was different from each other as shown in the above-described manufacturing methods, the value of the Δn was caused to differ from each other.

TABLE 3

| | Sample of pigment dispersion | | | | | | | | | |
|---|---|---|---|---|---|---|---|---|---|---|
| | RS-1 | RS-2 | RS-3 | RS-4 | GS-1 | GS-2 | YS-1 | YS-2 | BS-1 | VS-1 |
| Pigments | R-1 | R-2 | R-3 | R-4 | G-1 | G-2 | Y-1 | Y-2 | B-1 | V-1 |
| Pigment derivatives | D-1 | D-1 | D-2 | D-1 | D-3 | D-3 | D-3 | D-3 | D-4 | D-4 |
| 1st pigment | 10.7 | 10.7 | 10.7 | 10.7 | 10.7 | 10.7 | 10.7 | 10.7 | 10.7 | 10.7 |
| Pigment derivatives | 1.3 | 1.3 | 1.3 | 1.3 | 1.3 | 1.3 | 1.3 | 1.3 | 1.3 | 1.3 |
| Acrylic resin solution | 40 | 40 | 40 | 40 | 40 | 40 | 40 | 40 | 40 | 40 |
| Organic solvents | 48 | 48 | 48 | 48 | 48 | 48 | 48 | 48 | 48 | 48 |
| Total | 100 | 100 | 100 | 100 | 100 | 100 | 100 | 100 | 100 | 100 |
| $\Delta n$ | 0.050 | 0.042 | −0.010 | −0.012 | −0.011 | 0.010 | −0.027 | 0.010 | 0.010 | −0.013 | d) Preparation of Pigment Dispersion

The mixtures having the compositions (weight ratio) shown in the following Table 4 were respectively uniformly agitated to form a mixture, which was then subjected to dispersion for 5 hours by means of a sand mill using zirconia beads each having a diameter of 1 mm. The resultant dispersion was then subjected to filtration using a 5-μm filter, thereby obtaining pigment dispersions of red, green and blue pigment dispersions.

TABLE 4

| | | Pigment dispersion | | | | | | | | | | | |
|---|---|---|---|---|---|---|---|---|---|---|---|---|---|
| | | RP-1 | RP-2 | RP-3 | RP-4 | RP-5 | RP-6 | GP-1 | GP-2 | GP-3 | GP-4 | GP-5 | BP-1 |
| Kinds | 1st pigment | R-1 | R-2 | R-4 | R-4 | R-2 | R-2 | G-1 | G-1 | G-2 | G-2 | G-1 | B-1 |
| | 2nd pigment | R-3 | R-3 | R-3 | R-2 | R-4 | R-4 | Y-1 | Y-2 | Y-1 | Y-2 | G-2 | V-1 |
| | 3rd pigment | — | Y-1 | Y-1 | R-3 | R-3 | R-3 | — | — | — | — | Y-2 | — |
| | 4th pigment | | | | Y-2 | Y-2 | Y-1 | | | | | | |
| | Pigment derivatives 1 | D-1 | D-1 | D-1 | D-1 | D-1 | D-1 | D-3 | D-3 | D-3 | D-3 | D-3 | D-4 |
| | Pigment derivatives 2 | D-2 | D-2 | D-2 | D-2 | D-2 | D-2 | | | | | | |
| | Pigment derivatives 3 | | D-3 | D-3 | D-3 | D-3 | D-3 | | | | | | |
| Composition (wt. ratio) | 1st pigment | 9.6 | 4.7 | 4.7 | 0.2 | 0.5 | 1.2 | 8.1 | 8.1 | 8.3 | 8.3 | 1.5 | 9.4 |
| | 2nd pigment | 1.1 | 3.9 | 3.9 | 4.5 | 4.2 | 3.5 | 5.6 | 5.6 | 5.4 | 5.4 | 6.8 | 0.6 |
| | 3rd pigment | — | 2.1 | 2.1 | 3.9 | 3.9 | 3.9 | 0 | 0 | 0 | 0 | 5.4 | 0 |
| | 4th pigment | | | | 2.1 | 2.1 | 2.1 | | | | | | |
| | Total of pigment derivatives | 1.3 | 1.3 | 1.3 | 1.3 | 1.3 | 1.3 | 1.8 | 1.8 | 1.8 | 1.8 | 1.8 | 1.8 |
| | Acrylic resin solution | 40 | 40 | 40 | 40 | 40 | 40 | 36.5 | 36.5 | 36.5 | 36.5 | 36.5 | 40.2 |
| | Organic solvents | 48 | 48 | 48 | 48 | 48 | 48 | 48 | 48 | 48 | 48 | 48 | 48 |
| | Total | 100 | 100 | 100 | 100 | 100 | 100 | 100 | 100 | 100 | 1000 | 100 | 100 |

The mixtures having compositions shown in the following Table 5 were respectively agitated to obtain an uniform mixture and then the resultant mixture was subjected to filtration using a 5-μm filter, thereby obtaining photosensitive color compositions.

TABLE 5

| | Photosensitive color composition | | | | | | | | | | | |
|---|---|---|---|---|---|---|---|---|---|---|---|---|
| | RR-1 | RR-2 | RR-3 | RR-4 | RR-5 | RR-6 | GR-1 | GR-2 | GR-3 | GR-4 | GR-5 | BR-1 |
| Pigment dispersion (kinds) | RP-1 | RP-2 | RP-3 | RP-4 | RP-5 | RP-6 | GP-1 | GP-2 | GP-3 | GP-4 | GP-5 | BP-1 |
| Pigment dispersion (quantity) | 51 | 51 | 51 | 51 | 51 | 51 | 52 | 52 | 52 | 52 | 52 | 42 |
| Acrylic resin solution | 1 | 1 | 1 | 1 | 1 | 1 | 0 | 0 | 0 | 0 | 0 | 10 |
| Monomer | 4 | 4 | 4 | 4 | 4 | 4 | 4.8 | 4.8 | 4.8 | 4.8 | 4.8 | 5.6 |
| Photopolymerization initiator | 3.4 | 3.4 | 3.4 | 3.4 | 3.4 | 3.4 | 2.8 | 2.8 | 2.8 | 2.8 | 2.8 | 2 |
| Sensitizing agent | 0.4 | 0.4 | 0.4 | 0.4 | 0.4 | 0.4 | 0.2 | 0.2 | 0.2 | 0.2 | 0.2 | 0.2 |
| Organic solvents | 40.2 | 40.2 | 40.2 | 40.2 | 40.2 | 40.2 | 40.2 | 40.2 | 40.2 | 40.2 | 40.2 | 40.2 |
| Total | 100 | 100 | 100 | 100 | 100 | 100 | 100 | 100 | 100 | 100 | 100 | 100 | e) Retardation in Thickness Direction (Rth)

Coated films each having a different color were manufactured according to the following procedure and the values of retardation in thickness direction were measured.

By means of spin coating, each of green compositions shown in above Table 5 was coated on the surface of a glass substrate and then pre-baked for 20 minutes in a clean oven at a temperature of 70° C. Then, after being cooled to room temperature, the substrate was exposed to ultraviolet rays by making use of an ultra-high pressure mercury lamp. Thereafter, the resultant substrate was subjected to spray development by making use of an aqueous solution of sodium carbonate of 23° C., after which the resultant substrate was washed with ion-exchange water and air-dried. Subsequently, the resultant substrate was post-baked for 30 minutes in a clean oven at a temperature of 230° C., thereby forming color layers each formed on the surface of the glass substrate. The film thickness as dried of the cured color layer was 1.8 μm in every case.

The values of retardation in thickness direction were determined as follows. Namely, by making use of a retardation measuring apparatus (RETS-100; Ohtsuka Denshi Co., Ltd.), the retardation $\Delta(\lambda)$ of the coated film was measured from the direction which was angled by 45° from the normal direction of substrate having the coated film formed thereon. Then, by making use of this value, the three-dimensional refractive index was calculated and, based on this three-dimensional refractive index, the value of retardation in thickness direction (Rth) was calculated according to the following equation. In this case, a wavelength of 610 nm was used for the measurement of the red pixel, a wavelength of 545 nm was used for the measurement of the green pixel and a wavelength of 450 nm was used for the measurement of the blue pixel.

$$Rth=\{(Nx+Ny)/2-Nz\}\times d$$

(wherein Nx is the refractive index in the direction of x in the plane of color pixel layer; Ny is the refractive index in the direction of y in the plane of color pixel; Nz is the refractive index in the thickness direction of color pixel layer; Nx constitutes a lagging axis represented by $Nx \geq Ny$; and d is a thickness (nm) of color pixel.

The following Table 6 illustrates the values (Rth) of retardation in thickness direction which were obtained from each of color coat films (color layers) created using each of photosensitive color compositions shown in above Table 5. When it was tried to minimize the coloring of a liquid crystal display device as it is viewed obliquely at the time of black display in the combination of the value Rth of retardation in thickness direction of the retardation plate and of the liquid crystal material to be used in a liquid crystal display device with the value Rth of retardation in thickness direction of the color layer, the value Rth of retardation in thickness direction of the color layer was confined to $3 \leq Rth \leq 0$.

The results of above-described evaluation are shown in the following Table 6.

f) Measurement of Contrast

Each of color pixels formed on a transparent substrate was sandwiched between a pair of polarizing plates and a back light was applied to one of the polarizing plates and permitted to emit from the other of the polarizing plates and the luminance of light emitted from said other polarizing plate was measured by means of a luminance meter, thereby determining the luminance of light as these polarizing plates were disposed parallel with each other (Lp) and the luminance of light as these polarizing plates were disposed intersected orthogonally with each other (Lc), after which the ratio between (Lp) and (Lc) was calculated to determine the contrast C(C=Lp/Lc). Herein, CR was a value of contrast obtained in the case of red layer (coated film), CG was a value of contrast obtained in the case of green layer (coated film), and CB was a value of contrast obtained in the case of blue layer (coated film). CS was a value of contrast obtained in the case where only the transparent substrate was existed without accompanying the color filter (color layers).

The contrast of the color filter was calculated according to the aforementioned equation after the measurement of the color filter substrate having pixels of three colors, i.e. the red pixel, the green pixel and the blue pixel formed on the surface of black matrix. Since the contrast of color filter where three colors are concurrently measured has actually direct bearing on the image qualities of a liquid crystal display device, it is more important than the value of each of these color layers.

When the contrast ratio between CS and the contrast of each of color layers satisfies the conditions of, for example, CR/CS>0.45, CG/CS>0.45 and CB/CS>0.45, it is possible to obtain excellent front visibility when displaying black image of the liquid crystal display device. Namely, it is possible to reproduce a tight black display without accompanying leakage of light. On the other hand, if the conditions of: CR/CS>0.45, CG/CS>0.45 and CB/CS>0.45 are not satisfied, the leakage of light would become prominent when displaying black image, thus failing to obtain a liquid crystal display device which is excellent in front visibility.

Furthermore, when the difference in retardation in each of these colors is minimized, it is possible to obtain a liquid crystal device which is excellent in both oblique visibility and front visibility. By the way, even if the conditions of CR/CS>0.45, CG/CS>0.45 and CB/CS>0.45 are entirely satisfied, if the difference in retardation in each of these colors is large, the oblique visibility may become insufficient. In color layers employed in Examples, those exhibiting a contrast ratio of larger than 0.45 were used.

Incidentally, the measurement of contrast was executed by making use of a color luminance meter (for example, BM-5A; Topcon Co., Ltd.). Specifically, under the conditions where only a color layer having a single coated film formed on a transparent substrate or only a transparent substrate is sandwiched between a pair of polarizing plates, the luminance of

TABLE 6

| | Photosensitive color composition | | | | | | | | | | | |
|---|---|---|---|---|---|---|---|---|---|---|---|---|
| | RR-1 | RR-2 | RR-3 | RR-4 | RF-5 | RR-6 | GR-1 | GR-2 | GR-3 | GR-4 | GR-5 | BR-1 |
| x | 0.652 | 0.649 | 0.649 | 0.649 | 0.649 | 0.649 | 0.279 | 0.278 | 0.278 | 0.281 | 0.281 | 0.136 |
| Y | 0.33 | 0.329 | 0.328 | 0.329 | 0.328 | 0.328 | 0.601 | 0.598 | 0.6 | 0.6 | 0.599 | 0.103 |
| z | 19.5 | 19.7 | 18.6 | 19.6 | 19.5 | 19.5 | 53.3 | 54.9 | 54.5 | 55.3 | 55.3 | 11.8 |
| Rth | 15 | 10 | −4 | 9 | 1 | 0 | −12 | −9 | −6 | 1 | −1 | 0 |
| C/Cs | 0.25 | 0.83 | 0.58 | 1.08 | 1 | 0.97 | 0.4 | 0.63 | 0.58 | 0.52 | 0.5 | 0.5 |
| Sensitivity | ◯ | ◯ | ◯ | ◯ | ◯ | ◯ | ◯ | ◯ | ◯ | ◯ | ◯ | ◯ |
| Developing property | ◯ | ◯ | ◯ | ◯ | ◯ | ◯ | ◯ | ◯ | ◯ | ◯ | ◯ | ◯ |
| Resistance | ◯ | ◯ | ◯ | ◯ | ◯ | ◯ | ◯ | ◯ | ◯ | ◯ | ◯ | ◯ | light (Lp) where these polarizing plates are disposed parallel with each other and the luminance of light (Lc) under a condition wherein these polarizing plates are disposed intersected orthogonally with each other are respectively measured at a viewing angle of 2°, for example. As for the polarizing plate, it is possible to employ NPF-SE1224DU (Nittoh Denko Co., Ltd.). As for the light source for the backlight, it is possible to employ those having characteristics of: luminance=1937 cd/m$^2$, a chromaticity coordinate (x, y) in XYZ system of color representation chromaticity diagram is (0.316, 0.301), color temperature=6525K and chromaticity deviation duv=−0.0136.

4. Evaluation of Sensitivity

The sensitivity of each of the color compositions shown in above Table 6 was evaluated as described below.

Namely, at first, by means of spin coating, each of the photosensitive compositions thus obtained was coated on the surface of a glass substrate and then prebaked at 70° C. for 15 minutes, thereby forming a coated film having a film thickness of 2.3 μm. Then, by means of proximity exposure system using ultraviolet ray as an exposure light source, ultraviolet exposure was performed through a photomask provided with a fine line pattern of 50 μm. The dosage of exposure was set to eight levels, i.e. 30, 40, 50, 60, 70, 80, 90 and 100 J/cm$^2$.

Then, by making use of a 1.25 mass % sodium carbonate solution, the coated film was shower-developed and then washed with water. The resultant coated film was then subjected to a heat treatment for 20 minutes at 230° C., thus accomplishing the patterning of the coated film.

The film thickness of the color pixel thus obtained was divided by the film thickness (2.3 μm) of the non-exposure/non-development portion, thereby calculating the residual film ratio thereof. Then, an exposure sensitivity curve was plotted in a graph with the abscissa representing exposure dosages and the ordinate thereof representing residual film ratios after the development. Based on the exposure sensitivity curve thus obtained, the minimum amount of exposure which enabled the residual film ratio to keep 80% or more was defined as a saturated exposure dosage. Then, the sensitivity of the color compositions was evaluated according to the following standard.

○: Saturated exposure dosage was not more than 50 J/cm$^2$.

Δ: Saturated exposure dosage was more than 50 J/cm$^2$ but not more than 100 J/cm$^2$.

X: Saturated exposure dosage was more than 100 J/cm$^2$.

g) Evaluation of Patterning Properties

The patterning properties of each of the photosensitive color compositions in each of Examples and Comparative Examples were evaluated as described below.

Namely, at first, by means of spin coating, a black photosensitive color composition for forming a black matrix was coated on the surface of a glass substrate and then prebaked at 70° C. for 15 minutes, thereby forming a coated film having a film thickness of 2.3 μm. Then, by means of proximity exposure system using ultraviolet ray as an exposure light source, ultraviolet exposure was performed through a photomask provided with a stripe pattern having a line width of 10 μm. The dosage of exposure employed was of the above-described saturated exposure dosage.

Then, by making use of 1.25-wt % sodium carbonate, the coated film was shower-developed and then washed. The time for the development was appropriately determined so as to enable non-exposed coated film to be washed away. The resultant coated film was then subjected to a heat treatment for 20 minutes at 230° C., thus manufacturing test substrates.

Example 1

A color filter was manufactured through a combination of photosensitive color compositions shown in above Table 6 and by making use of the method described below.

First of all, by means of spin coating, a photosensitive red composition (RR-5) was coated on the surface of a glass substrate having a black matrix formed thereon in advance and then pre-baked for 20 minutes in a clean oven at a temperature of 70° C. Then, after being cooled to room temperature, the substrate was exposed, through a photomask, to ultraviolet rays by making use of an ultra-high pressure mercury lamp.

Thereafter, the resultant substrate was subjected to spray development by making use of an aqueous solution of sodium carbonate of 23° C., after which the resultant substrate was washed with ion-exchange water and air-dried. Further, the resultant substrate was post-baked for 30 minutes in a clean oven at a temperature of 230° C., thereby forming a red pixel having stripe-like configuration on the substrate.

Then, by making use of a photosensitive green composition (GR-4), a green pixel was formed in the same manner as described above and, further, by making use of a photosensitive blue composition (BR-1), the blue pixel was formed in the same manner as described above, thereby obtaining a color filter. The film thickness of each of these color pixels was 2.0 μm in every case.

Manufacture of a Liquid Crystal Display Device

An over-coat layer and a transparent electrode were formed on the surface of color filter thus obtained and then a polyimide alignment layer was formed thereon. On the other hand, a TFT array and pixel electrodes were formed on one surface of another (second) glass substrate.

A couple of glass substrates thus prepared were positioned face to face so as to make the electrode layers thereof face to each other. Then, these glass substrates were aligned with each other while securing a predetermined gap between these substrates by making use of a spacer and then the outer circumference of this composite body of substrates was entirely sealed while leaving an opening for injecting a liquid crystal composition. Thereafter, a liquid crystal composition for VA was injected, via the opening, into the gap and then the opening was closed to obtain a liquid crystal cell.

A polarizing plate was adhered to the opposite outer surfaces of the liquid crystal cell. The polarizing plate employed herein was furnished with an optical compensation layer which was optimized so as to realize a wide viewing angle display.

The liquid crystal display device thus manufactured was assembled with a back light unit to obtain a liquid crystal panel of VA (vertical alignment) display mode.

Examples 2 and 3, Comparative Examples 1 and 2

Color filters 2-5 were manufactured in the same manner as described in Example 1 except that the photosensitive color compositions described in the following Table 7 were employed respectively as the photosensitive color composition. Then, by making use of these color filters, liquid crystal display devices were manufactured.

<Assessment of Visibility of Liquid Crystal Display Device when Displaying Black State>

The liquid crystal display devices manufactured as described above were respectively operated so as to display black state and the amount of the light leaked out from the liquid crystal panel (orthogonally permeated light; leaked light) in the normal direction (approximately vertical direction) of liquid crystal panel and in a slanted direction which was inclined by 45° from the normal direction (oblique angle) was visually observed. Further, the chromaticity as the panel was viewed in approximately vertical direction at the time of displaying black state (u(⊥), v(⊥)) and the chromaticity as the panel was viewed obliquely by an angle of up to 60° in maximum from the normal direction (u(45), v(45)) were measured by making use of BM-5A (Topcon Co., Ltd.). Then, the color difference Δu'v' was calculated and the maximum value of Δu'v' under the condition 0≦θ≦60° was determined.

The ranking of assessment was as follows, the results being illustrated in the following Table 7.

If the color difference Δu'v' is confined to not more than 0.02, it can be recognized as being pure black state in the level of visual observation. If the color difference Δu'v' is larger than 0.02, the black state will be seen as reddish black or purplish black, for instance, and hence undesirable. The liquid crystal display devices according to Examples 1-3 of the present invention were all indicated a color difference of as small as less than 0.02, thus indicating the capability of displaying tightened black state.
○: Oblique coloring Δu'v' in the visibility assessment was not higher than 0.02
X: Oblique coloring Δu'v' in the visibility assessment was higher than 0.02

TABLE 7

| Color filter used | Photosensitive color composition used | | | Visibility assessment (oblique coloring) |
| --- | --- | --- | --- | --- |
| | Red | Green | Blue | |
| Ex. 1 | Color filter 1 | RR-5 | GR-4 | BR-1 | ○ |
| Ex. 2 | Color filter 2 | RR-6 | GR-5 | BR-1 | ○ |
| Ex. 3 | Color filter 3 | RR-5 | GR-5 | BR-1 | ○ |
| Comp. Ex. 1 | Color filter 4 | RR-2 | GR-2 | BR-1 | X |
| Comp. Ex. 2 | Color filter 5 | RR-3 | GR-3 | BR-1 | X |

It will be recognized from above Table 7 that in the cases of Examples 1, 2 and 3 where the color filters employed in the liquid crystal display device were formed by making use of a photosensitive resin composition containing two or more kinds of pigments each having a predetermined absolute value of birefringence Δn and were constructed such that the retardation in thickness direction values of the red pixel, the green pixel and the blue pixel were confined to fall within the range of 0-3 nm, the oblique visibility thereof was excellent.

Whereas, in the cases of Comparative Examples 1 and 2, it will be recognized that since the amounts of three kinds of pigments each having a predetermined absolute value of birefringence Δn was selected to fall outside the predetermined range of the present invention, the absolute value of retardation in thickness direction of the red pixel, the green pixel and the blue pixel was caused to fall outside the range of 0-3 nm, thereby deteriorating the oblique visibility thereof.

The results measured of the color difference Δu'v', the contrast of single color in the color pixel layers and the color filter (CF) contrast in Examples 1-3 and Comparative Examples 1 and 2 are shown in the following Table 8.

TABLE 8

| | | Contrast | | | |
| --- | --- | --- | --- | --- | --- |
| | Δu'v' | Red | Green | Blue | CF contrast |
| Ex. 1 | 0.012 | 12500 | 9500 | 8800 | 9700 |
| Ex. 2 | 0.015 | 11900 | 9400 | 8800 | 9610 |
| Ex. 3 | 0.016 | 12500 | 9500 | 8800 | 9700 |

TABLE 8-continued

| | | Contrast | | | |
| --- | --- | --- | --- | --- | --- |
| | Δu'v' | Red | Green | Blue | CF contrast |
| Comp. Ex. 1 | 0.045 | 11000 | 9450 | 8800 | 9400 |
| Comp. Ex. 2 | 0.050 | 9900 | 9450 | 8800 | 9100 |

It will be recognized from above Table 8 that the contrast of the color filters of Examples 1-3 was higher than that of Comparative Examples 1 and 2, thus indicating the effectiveness of the present invention.

What is claimed is:

1. A color filter substrate which exhibits color filter contrast of not less than 9000 and comprises:
   a transparent substrate; and
   a plurality of color pixels differing in color and formed on the transparent substrate,
   wherein each of the plurality of color pixels is formed of a photosensitive color composition containing two or more kinds of pigments, a birefringence Δn of a pigment dispersion represented by following equation (1) and a content of pigments contained in the photosensitive composition satisfies all of below-described conditions (a), (b) and (c), and, an absolute value of retardation in thickness direction (Rth) of the color pixels which is represented by following equation (2) is confined to a range of 0-3 nm:
   (a) a content of a pigment exhibiting an absolute value of birefringence Δn less than 0.011 is confined to 34% by mass to 100% by mass based on a total amount of pigments in the photosensitive color composition;
   (b) (a content of pigment exhibiting an absolute value of birefringence Δn less than 0.011)>(a content of pigment exhibiting an absolute value of birefringence Δn not less than 0.011 and less than 0.016)≧0; and
   (c) (a content of pigment exhibiting an absolute value of birefringence Δn not less than 0.011 and less than 0.016) ≧(a content of pigment exhibiting an absolute value of birefringence Δn of 0.016-0.055)≧0:

$$\Delta n = n_{XY} - n_Z \quad (1)$$

wherein $n_{XY}$ is an average in-plane refractive index; and $n_Z$ is a refractive index in thickness direction; and $$Rth = \{(Nx+Ny)/2 - Nz\} \times d \quad (2)$$

wherein Nx is a refractive index in x-direction in plane of a color layer constituting the color pixel; Ny is a refractive index in y-direction in plane of a color layer constituting the color pixel; Nz is a refractive index in thickness direction of a color layer constituting the color pixel; Nx constitutes a lagging axis represented by Nx≧Ny; and d is a thickness (nm) of the color layer.

2. The color filter substrate according to claim 1, wherein the plurality of color pixels differing in color each exhibits contrast of not less than 8000 as a monochrome color layer.

3. The color filter substrate according to claim 1, wherein one of the plurality of color pixels is a red pixel and two or more kinds of pigments contained in the photosensitive color composition constituting the red pixel are formed of C.I. Pigment Red 254, C.I. Pigment Red 177 and C.I. Pigment Yellow 150.

4. The color filter substrate according to claim 1, wherein one of the plurality of color pixels is a red pixel and two or more kinds of pigments contained in the photosensitive color composition constituting the red pixel are formed of C.I. Pigment Red 254, C.I. Pigment Red 177 and C.I. Pigment Yellow 138.

5. The color filter substrate according to claim 1, wherein one of the plurality of color pixels is a green pixel and two or more kinds of pigments contained in the photosensitive color composition constituting the green pixel are formed of C.I. Pigment Green 58 and C.I. Pigment Yellow 150.

6. The color filter substrate according to claim 1, wherein one of the plurality of color pixels is a green pixel and two or more kinds of pigments contained in the photosensitive color composition constituting the green pixel are formed of C.I. Pigment Green 36, C.I. Pigment Green 58 and C.I. Pigment Yellow 150.

7. The color filter substrate according to claim 1, wherein one of the plurality of color pixels is a blue pixel and two or more kinds of pigments contained in the photosensitive color composition constituting the blue pixel are formed of C.I. Pigment Blue 15:6 and C.I. Pigment Violet 23.

8. The color filter substrate according to claim 1, wherein one of the plurality of color pixels is a blue pixel, two or more kinds of pigments contained in the photosensitive color composition constituting the blue pixel are formed of C.I. Pigment Blue 15:6 and C.I. Pigment Violet 23, and the photosensitive color composition forming the blue pixel further contains a pigment derivative represented by the following chemical formula:

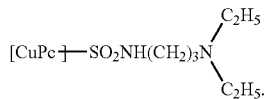

CuPc: Copper phthalocyanine residue

9. A liquid crystal display device which is provided with the color filter substrate claimed in claim 1 and exhibits a color difference Δu'v' of 0.02 or less.

* * * * *